United States Patent
Hornischer et al.

(10) Patent No.: US 9,995,332 B2
(45) Date of Patent: Jun. 12, 2018

(54) FASTENING DEVICE FOR TAMPER-PROOF FASTENING, AND COMPONENT ARRANGEMENT

(71) Applicant: AUDI AG, Ingolstadt (DE)

(72) Inventors: Jörg Hornischer, Wettstetten (DE); Bernhard Hennig, Wettstetten (DE)

(73) Assignee: AUDI AG, Ingolstadt (DE)

( * ) Notice: Subject to any disclaimer, the term of this patent is extended or adjusted under 35 U.S.C. 154(b) by 28 days.

(21) Appl. No.: 15/120,365

(22) PCT Filed: Feb. 7, 2015

(86) PCT No.: PCT/EP2015/000256
§ 371 (c)(1),
(2) Date: Aug. 19, 2016

(87) PCT Pub. No.: WO2015/124267
PCT Pub. Date: Aug. 27, 2015

(65) Prior Publication Data
US 2017/0067497 A1 Mar. 9, 2017

(30) Foreign Application Priority Data
Feb. 22, 2014 (DE) .................. 10 2014 002 541

(51) Int. Cl.
*F16B 35/06* (2006.01)
*F16B 37/14* (2006.01)
(Continued)

(52) U.S. Cl.
CPC .......... *F16B 35/042* (2013.01); *F16B 5/0642* (2013.01); *F16B 21/186* (2013.01);
(Continued)

(58) Field of Classification Search
CPC ........ F16B 37/14; F16B 41/005; F16B 35/06; F16B 21/20
(Continued)

(56) References Cited

U.S. PATENT DOCUMENTS 294,524 A * 3/1884 Stiemke .................. F16B 37/14
411/374
1,751,779 A * 3/1930 Von Senden .......... F16B 41/005
411/337
(Continued)

FOREIGN PATENT DOCUMENTS

| CN | 2714877 Y | 8/2005 |
| CN | 202279064 U | 6/2012 |

(Continued)

OTHER PUBLICATIONS

Chinese Search Report issued by the Chinese Patent Office in Chinese Application No. 2015800096134 dated May 18, 2017.
(Continued)

*Primary Examiner* — Flemming Saether
(74) *Attorney, Agent, or Firm* — Henry M. Feiereisen LLC

(57) ABSTRACT

A fastening device for fastening a first component to a second component in a tamper-proof manner, includes a screw having an actuation region that can be at least partially arranged in a receptacle of the first component; and a threaded region that is connected to the actuation region and can be connected to the second component in a retaining manner. In addition, the screw includes a security projection which adjoins the actuation region, and is arranged on the side of the actuation region facing away from the threaded region and has latching element that engages with a counter
(Continued)

latching element of a covering device of the fastening device, wherein the covering device at least partially covers the receptacle.

9 Claims, 4 Drawing Sheets

(51) Int. Cl.
    *F16B 35/04*     (2006.01)
    *F16B 5/06*     (2006.01)
    *F16B 21/18*     (2006.01)
    *F16B 41/00*     (2006.01)

(52) U.S. Cl.
    CPC ............ *F16B 35/06* (2013.01); *F16B 41/005* (2013.01); *F16B 37/14* (2013.01)

(58) Field of Classification Search
    USPC .......... 411/372.5, 372.6, 373, 910, 388, 521, 411/526
    See application file for complete search history.

(56) References Cited

U.S. PATENT DOCUMENTS

| | | | | |
|---|---|---|---|---|
| 1,778,576 | A * | 10/1930 | Walker | B25B 1/24 269/245 |
| 2,151,284 | A | 3/1939 | Tinnermann | |
| 3,241,427 | A * | 3/1966 | Bosler | F16B 37/14 4/252.1 |
| 3,724,150 | A | 4/1973 | Hudnall | |
| 3,880,394 | A * | 4/1975 | Wisecarver | E04G 25/06 211/123 |
| 3,921,687 | A | 11/1975 | Stencel | |
| 4,133,583 | A * | 1/1979 | Spisak | B60B 7/10 301/37.34 |
| 4,209,660 | A | 6/1980 | Flachbarth et al. | |
| 6,206,604 | B1 * | 3/2001 | Dembowsky | F16B 21/075 403/122 |
| 7,226,233 | B2 * | 6/2007 | SuBenbach | F16B 21/186 403/122 |
| 7,470,081 | B2 * | 12/2008 | Miyahara | F16B 21/075 123/195 C |

FOREIGN PATENT DOCUMENTS

| | | |
|---|---|---|
| DE | 198 36 108 A1 | 6/1999 |
| DE | 201 17 323 U1 | 1/2002 |
| DE | 203 15 778 U1 | 12/2003 |
| DE | 10 2007 041 537 A1 | 3/2009 |
| DE | 10 2011 052 190 A1 | 1/2013 |
| EP | 0 824 173 A1 | 2/1998 |
| FR | 2 239 146 | 2/1975 |
| GB | 485974 A | 5/1938 |
| GB | 2 014 265 A | 8/1979 |
| GB | 2 465 371 A | 5/2010 |

OTHER PUBLICATIONS

English translation of Chinese Search Report issued by the Chinese Patent Office in Chinese Application No. 2015800096134 dated May 18, 2017.
International Search Report issued by the European Patent Office in International Application PCT/EP2015/000256.

* cited by examiner

FASTENING DEVICE FOR TAMPER-PROOF FASTENING, AND COMPONENT ARRANGEMENT

CROSS-REFERENCES TO RELATED APPLICATIONS

This application is the U.S. National Stage of International Application No. PCT/EP2015/000256, filed Feb. 7, 2015, which designated the United States and has been published as International Publication No. WO 2015/124267 and which claims the priority of German Patent Application, Serial No. 10 2014 002 541.1, filed Feb. 22, 2014, pursuant to 35 U.S.C. 119(a)-(d).

BACKGROUND OF THE INVENTION

The invention relates to a fastening device for manipulation proof fastening of a first component on a second component, wherein the fastening device has a screw which has an actuating region arranged in a receptacle of the first component and a threaded region which adjoins the actuating region and can be brought in retaining engagement with the second component. The invention also relates to a component arrangement.

In many connections of components, for example the first component and the second component, it is desirable to prevent a manipulation of the connection or at least make the manipulation of the connection apparent. The term manipulation hereby refers in particular to undoing the fastening. For example the first component and the second component are part of a housing, which encloses a device, in particular an electrical device, at least partially, preferably completely. The housing insofar prevents for example that a person can come into contact with the device from outside the housing. This is in particular the case when the device is configured as electrical device and contains high-voltage components which during their operation are impinged with high voltages, in particular of at least 100 V, at least 200 V, at least 300 V, at least 400 V or at least 500 V. The first component and the second component can hereby together form the housing, wherein for example the first component is present in the form of a covering device and the second component as a housing shell, which can be closed by the covering device.

The first component is fastened on the second component at least partially with the aid of the fastening device, wherein the fastening device has the screw. The screw has at least the actuating region and the threaded region. The former serves for engagement with a fastening tool, for example a key (wrench, screwdriver) or the like on the screw. For this purpose the actuating region has preferably an appropriate outer contour and/or a recess with an inner contour that is adapted to the fastening tool. The inner contour can be any desired screw head drive for example a slot, an internal square, internal hexagon, a cross slot, a hexagon socket, a Torx-contour and/or an internal serration. Of course also manipulation-proof variants of these screw head drives can be realized so that the inner contour is present as inner hexagon-TR, Torx-TR, Tree-wing, Torq-Set or Pentalobe. The actuating region is for example configured as a screw head. In another embodiment the screw head only forms a part of the actuating region.

Directly or indirectly adjoining the actuating region in axial direction relative to a longitudinal center axis of the screw is the threaded region. The threaded region has a thread, preferably an outer thread. When fastening the first component to the second component the thread engages in the second component. For example the thread hereby interacts with an inner thread formed in the second component. As an alternative the thread can of course also be configured as self-cutting thread or the like. Between the threaded region and the actuating region a connecting region can be provided, which in particular does not have a thread. After fastening of the two components to each other the actuating region is to be at least partially, in particular completely, arranged in the receptacle of the first component. In this way access to the actuating region is at least made more difficult because a user can no longer bring a tool in operative connection with the actuating region for releasing the fastening.

The state of the art includes for example the patent document FR 2 239 146. Also so-called breakaway bolts are known. In such breakaway bolts the screw head tears off during fastening, in particular when a defined torque that acts on the screw head is applied or exceeded. The breakaway bolt can then only be loosened with a special tool or by special measures such as drilling. This means however that during the fastening of the components to each other the screw head accrues as waste and that the loosening of the connection is very complicated.

SUMMARY OF THE INVENTION

It is an object of the invention to propose a fastening device which has advantages compared to the state of the art, and which in particular reliably prevents a manipulation of the fastening of the first component on the second component or at least makes such a manipulation apparent, wherein in addition unnecessary waste is avoided.

According to the invention this is achieved with a fastening device with the features of the corresponding independent patent claim. Hereby the screw has a safety protrusion which adjoins the actuating region and which is arranged on the side of the thread which faces away from the actuating region and has a latching element which latchingly interacts with a latching element of a cover element that at least partially covers the receptacle. The screw thus includes at least the threaded region, the actuating region and the safety protrusion. The screw can for example consist exclusively of these elements.

The term threaded region preferably means that region in which—viewed in axial direction relative to the longitudinal center axis of the screw—the thread or outer thread is located. The actuating region correspondingly includes preferably only the screw head, which for example has an outer diameter, which is greater than the outer diameter of the threaded region and/or the safety protrusion. Preferably the safety protrusion directly adjoins the fastening region, i.e., it extends from the fastening region. However, also an indirect arrangement of the safety protrusion on the actuating region can be provided.

It is provided that the safety protrusion has the latching element, which serves for holding the covering device. For holding the covering device the latching element interacts with the counter-latching element. The covering device, which is a part of the fastening device, is configured so that it covering devices the receptacle at least partially, preferably completely. The covering device covering devices the receptacle hereby preferably in such a manner that the actuating region of the screw is not accessible or at least not accessible per se from an outer environment of the fastening device, i.e., from outside the receptacle. For example this purpose the covering device is located in the receptacle but is arranged on the side of the actuating region that faces away from the threaded region. Hereby it is preferably provided that the covering device has outer dimensions in radial direction that correspond to the inner dimensions of the receptacle. As an alternative the outer dimension of the covering device can also be smaller in radial direction than the inner dimensions of the receptacle. Preferably the outer dimensions are however at least 90%, at least 80%, at least 75%, at least 70%, at least 60% or at least 50% of the inner dimension of the receptacle.

It can also be provided that the covering device—viewed in axial direction—is situated outside the receptacle. In this case the covering device can have dimensions in radial direction that correspond to the description above. Preferably however in this case the outer dimensions of the covering device in radial direction are greater than the inner dimensions of the receptacle, for example at least 100%, at least 110%, 120%, or 125% of the inner dimensions. Such a configuration, in which the covering device has greater dimensions in radial direction than the receptacle, achieves that the covering device rests upon the first component outside the receptacle at least in regions so that access to the actuating region of the screw is reliably prevented. As an alternative the covering device can of course also be spaced apart from the receptacle in axial direction of the receptacle. The covering device or the latching element is provided for latching engagement with the safety protrusion or its latching element. The latching interaction is for example achieved by a form fitting connection between the latching element and the counter-latching element.

A preferred embodiment of the invention provides that the safety protrusion has a circular cross section with regard to a longitudinal center axis of the screw. The safety protrusion insofar has an outer contour that is round for example circular cylindrical. This prevents that a torque can be exerted via the safety protrusion on the safety protrusion that is directed towards loosening the screw. Although it is possible to engage a pliers or similar tool on the safety protrusion. This however leaves visible marks so that the manipulation of the fastening device can subsequently be reliably detected. Preferably the safety protrusion has the circular cross section on the side of the covering device that faces away from the actuating region, particularly preferably the entire safety protrusion has the circular cross section.

A further embodiment of the invention provides that a free end of the safety protrusion, which faces away from the actuating region, is in particular semi-spherical. The safety protrusion directly adjoins the actuating region with its end. The safety protrusion terminates at its second end that is opposite the first end, and is thus a free end. In analogy to the description above, the spherical segment shape or the semi-spherical shape of this free end prevents an exertion of a torque, which is directed toward the loosening of the screw. In addition this shape facilitates placement of the covering device on the safety protrusion.

A particularly preferred embodiment of the invention provides that the safety protrusion has dimensions in radial direction that are smaller than the smallest radial dimension of the actuating region. The actuating region for example has an outer contour, which is circular in cross section. As an alternative the outer contour is an outer polygon, for example an outer hexagon, outer square or the like. When viewed in radial direction the safety protrusion does not protrude over at any point over the actuating region along the entire circumference. This means that its greatest dimensions are smaller in radial direction than the smallest radial dimension of the actuating region respectively viewed over the entire circumference of the safety protrusion or the actuating region. Such a configuration enables a simple engagement on the fastening region and correspondingly a simple screwing in of the screw when mounting the components to each other by means of the fastening device.

An embodiment of the invention provides that the latching element is constructed as a latching depression. Correspondingly the counter-latching element is configured as latching protrusion. The latching depression is for example provided in circumferential direction continuously on the safety protrusion. As an alternative of cause also multiple latching depressions can be provided spaced apart from each other on the safety protrusion. The in circumferential direction continuous shape of the latching depression is however advantageous insofar as it permits arrangement of the covering device in any desired orientation in circumferential direction. In addition such a configuration enables a rotatable support of the covering device on the safety protrusion, which effectively prevents the application of a torque on the safety protrusion with simple measures.

In a preferred embodiment of the invention the covering device is configured as a clamping disc, wherein the latching element has at least one latching protrusion, which engages in the latching depression. The clamping disc has for example a conventional configuration. In particular it has a basic body from which the latching element extends inwards in radial direction. The base body and the counter-latching element are in particular made of steel, for example a spring steel. Also other materials such as plastic can be used. The counter-latching element has the at least one latching protrusion. Particularly preferably multiple latching protrusions are provide which extend from the base body inwards in radial direction which however are separated from each other in circumferential direction. The latching protrusions are insofar present as latching tongues, in particular as latching spring tongues. For example an even number of latching protrusions is provided, wherein two of the latching protrusions are respectively arranged opposite each other.

In another embodiment of the invention the covering device can have dimensions in radial direction that are greater than the greatest radial dimension of the fastening region. Such a configuration of the covering device effectively prevents an engagement on the actuating region by means of an inappropriate tool. The covering device is preferably arranged and configured so that an engagement in the actuating region is only possible after removing the covering device from the safety protrusion. As mentioned above the covering device or the clamping disc can have greater dimensions in radial direction than the receptacle.

Finally It can also be provided that the actuating region is present as outer polygonal region. The term outer polygonal region for example means an outer square region or an outer hexagonal region just to mention the most conventional configurations. Of course other configurations can also be realized.

The invention also relates to a component arrangement for manipulation-proof fastening of the first component on the second component, in particular a fastening device according to the description above, wherein the fastening device has a screw which has an actuating region which is at least partially arranged in a receptacle of the first component and a threaded region which adjoins the actuating region and is in retaining engagement with the second component. Hereby the screw has a safety protrusion which adjoins the actuating region and which is arranged on a side of the actuating region, which faces away from the threaded region and has a latching element which latchingly interacts with a counter-latching element of a covering device, which at least partially covering devices the receptacle. The advantages of such a configuration of the component arrangement or the fastening device where discussed above. The component arrangement and the fastening device can be modified according to the description above to which reference is made here.

In a preferred embodiment of the invention the covering device covering devices the receptacle at least partially, in particular completely. This was also mentioned above. The at least partial or complete covering deviceing of the receptacle by the covering device is provided after the mounting of the component arrangement by means of the fastening device.

BRIEF DESCRIPTION OF THE DRAWING

In the following the invention is explained in more detail by way of the exemplary embodiments shown in the drawing without limiting the invention. Hereby it is shown in FIG. 1 a component arrangement with a first component, a second component and a fastening device, FIG. 2 a detail view of the fastening device, FIG. 3 a section view through a region of the component arrangement, FIG. 4 a screw of the fastening region, and FIG. 5 a covering device of the fastening device.

DETAILED DESCRIPTION OF PREFERRED EMBODIMENTS

Figure 1:
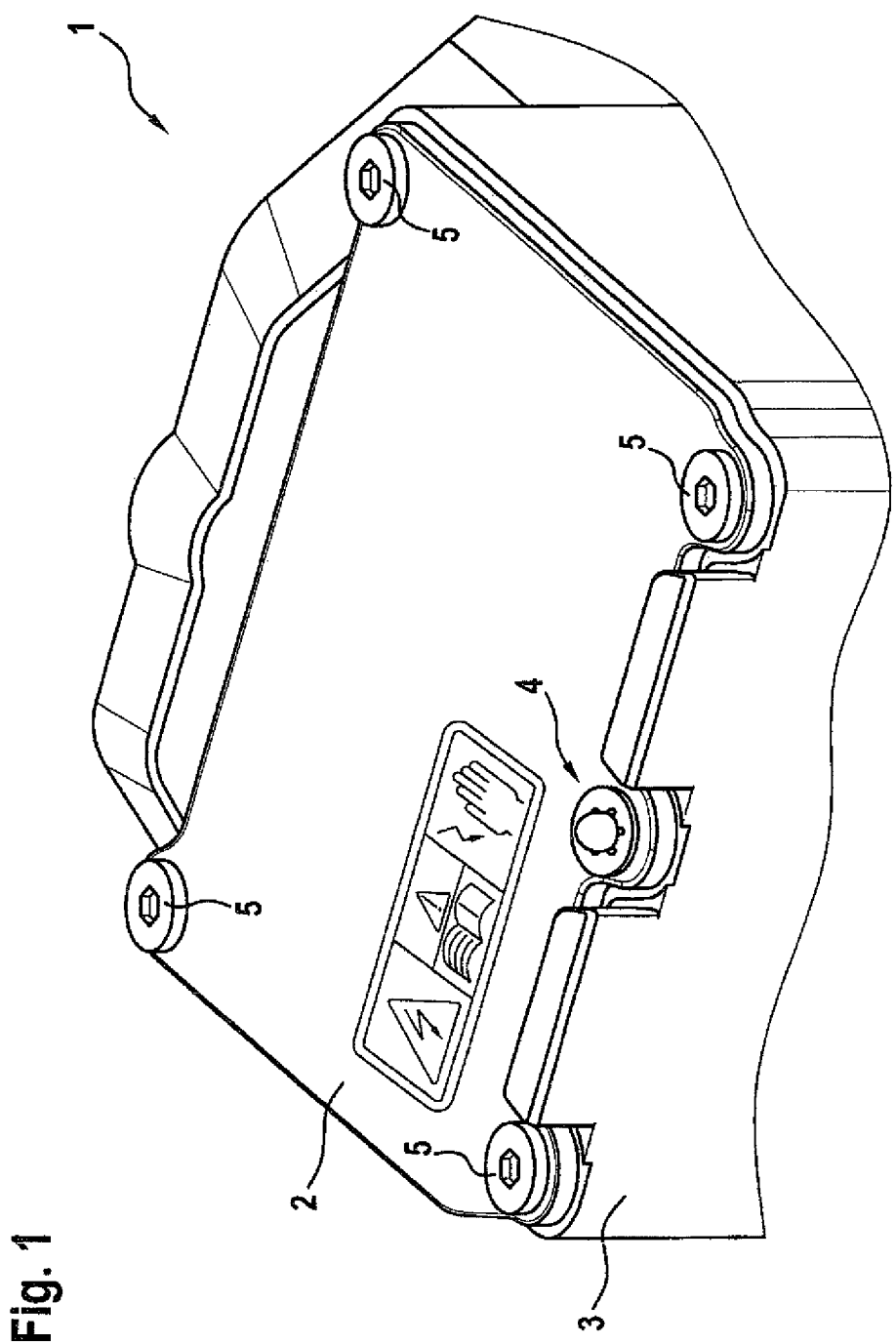

FIG. 1 shows a region of a component arrangement 1 which has a first component 2, a second component 3 and a fastening device 4. The components 2 and 3 form a housing for example for a here not further shown device, wherein the components 2 and 3 preferably enclose this device, in particular completely, after being fastened to each other. The fastening device 4 serves for manipulation-proof fastening of the first component 2 on the second component 3. In addition at least one further fastening element 5 for fastening the components 2 and 3 can be provided, wherein the fastening element 5 is for example a screw.

The fastening device 4 is configured so as to enable a simple fastening of the components 2 and 3 to each other, however loosening of the fastening is prevented or at least made difficult. In particular the fastening device 4 is configured so that a manipulation or an attempted manipulation of the fastening device 4 can subsequently easily be recognized for example based on damage caused on the fastening device 4.

Figure 2:
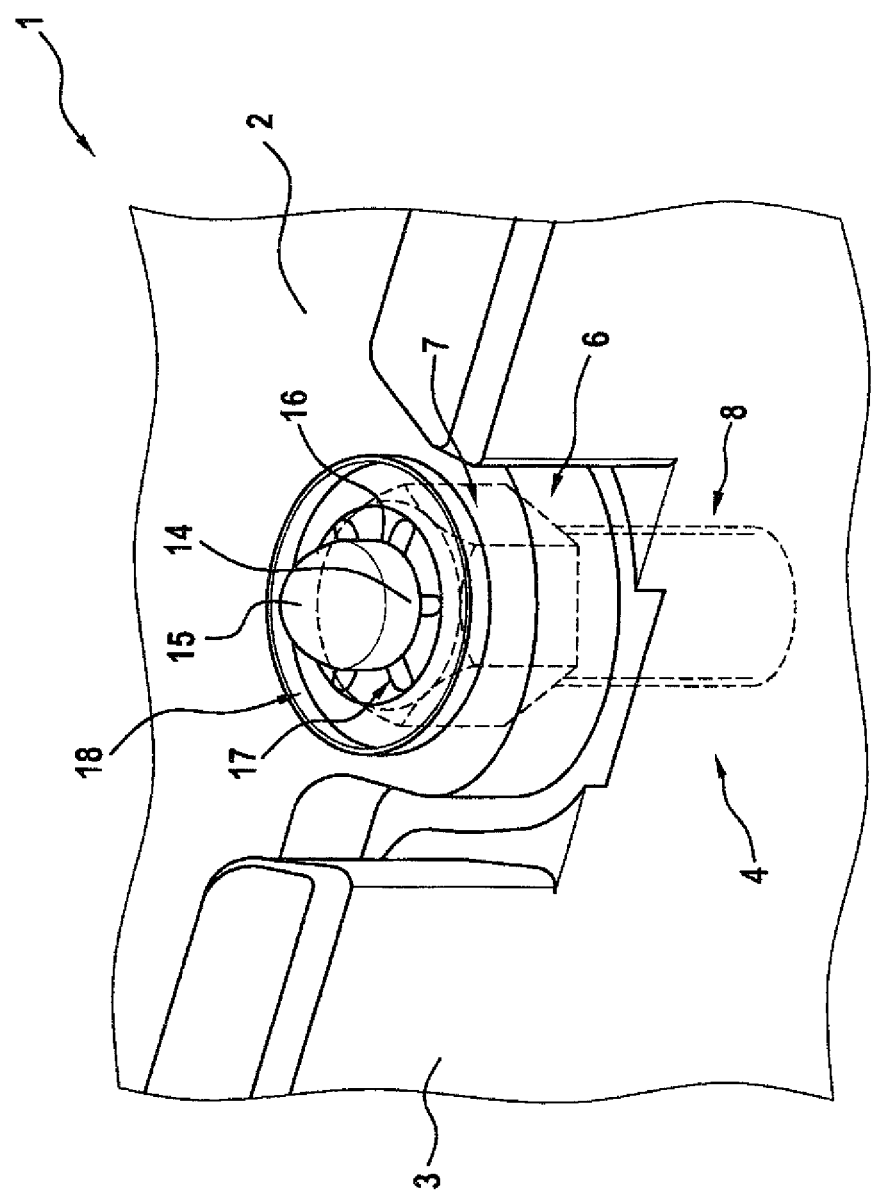

FIG. 2 shows a detail view of a region of the component arrangement 1, in particular the fastening device 4. It can be recognized that the fastening device 4 has a screw 6, which has an actuating region 7 and a threaded region 8. The actuating region 7 is configured for engagement of an appropriate tool, in the here shown example the actuating region is configured as outer hexagon. The threaded region 8 is provided with a thread 9, in particular an outer thread, which for example interacts with a further thread 10 arranged in the second component 3, in particular an inner thread.

After mounting the component arrangement 1, in particular after a fastening of the components 2 and 3 to each other by means of the fastening device 4, the actuating region 7 is present at least partially in a receptacle 11, while the threaded region 98 at least partially engages in the second component 3 or is in holding engagement with the second component. It can be provided that in axial direction relative to the longitudinal center axis 12 of the fastening device 4 a connecting region 13 is present between the actuating region 7 and the threaded region 8. As an alternative, the threaded region 8 can extend as far as to the actuating region 7. In the former case the threaded region 8 only adjoins the actuating region 7 indirectly, while in the latter case it adjoins the actuating region 7 directly.

The screw 6 has beside the actuating region 7 and the threaded region 8 a safety protrusion 14, which has a free end 15 with which it extends form the actuating region 7. The safety protrusion 14 preferably directly adjoins the actuating region 7. The free end 15 is preferably spherical sectional shaped, in particular semi-spherically. On the safety protrusion 14 a latching element 16 is provided which latchingly interacts with a counter-latching element 17 of a covering device 18 in order to hold the covering device 18 on the safety protrusion 14.

Figure 3:
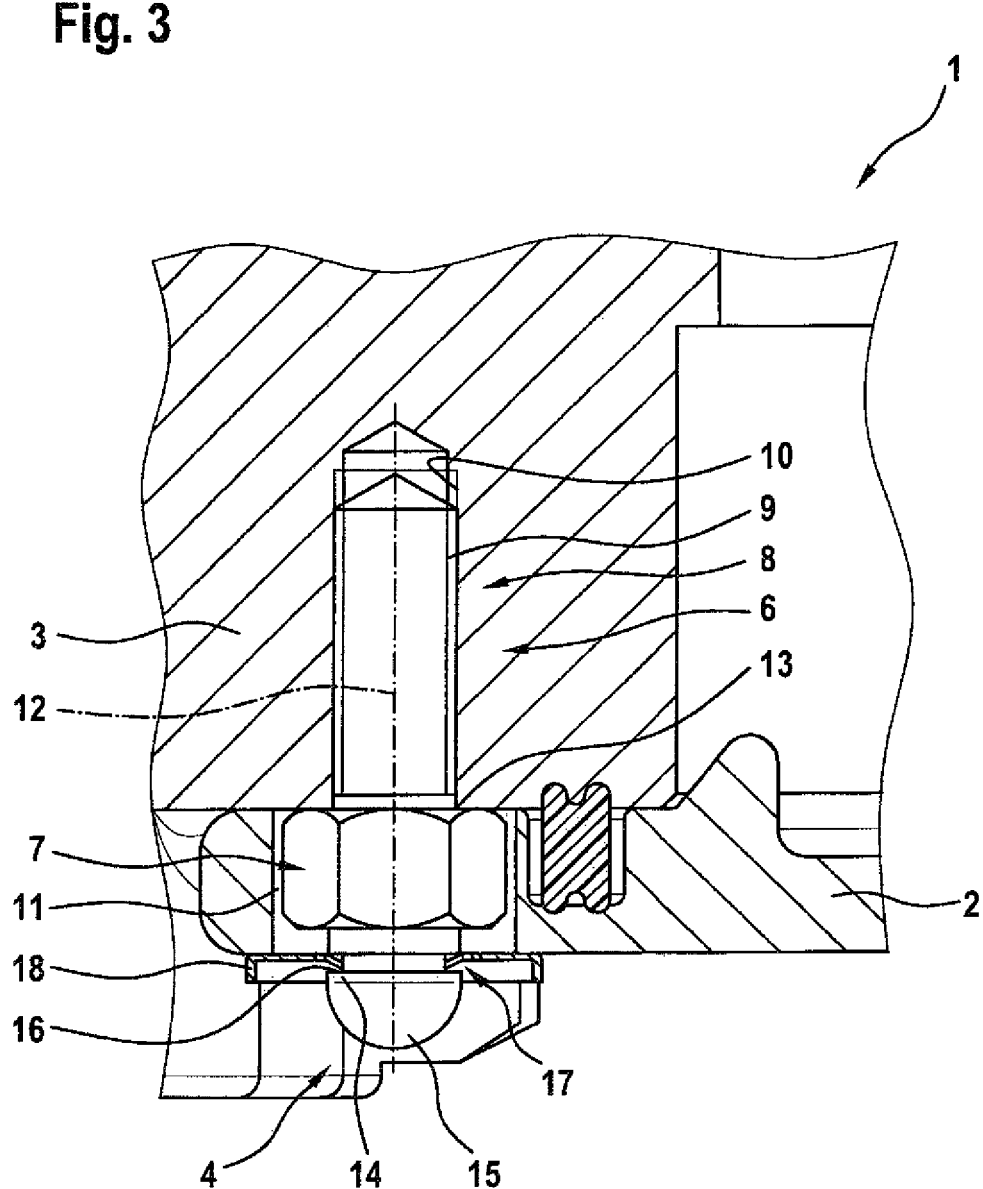

FIG. 3 shows a sectional view through a region of the component arrangement 1. It can be seen that the actuating region 7 is configured in axial direction so that it at least partially, in particular completely, is arranged in the receptacle 11. Particularly preferably the receptacle 11 has in axial direction a depth, which is greater than the height of the actuating region 7. The safety protrusion 14 is configured so that it protrudes out of the receptacle 11 on the side that faces away from the threaded region 8, protrudes over the first component 2. The covering device 18 arranged on the safety protrusion 14 is for example configured as a clamping disc. The covering device can insofar have a circular outer contour in longitudinal section.

The covering device 18 has dimensions in radial direction that are dimensioned so that the covering device 18 completely covering devices the receptacle 11. For this purpose the covering device has for example dimensions that are at least 105%, at least 110%, at least 115%, at least 120% or at least 125% of the dimensions of the receptacle 11 in radial direction. This prevents that after fastening the covering device 18 on the safety protrusion 14 the screw 6 is actuated via the actuating region 7, i.e., a torque directed toward the loosening of the screw 6 is applied via the actuating region 7. Rather for this purpose the covering device 18 first has to be removed or alternatively the safety protrusion 14 has to be engaged. Both however leaves marks so that the manipulation of the fastening device 4 can subsequently be easily detected.

Figure 4:
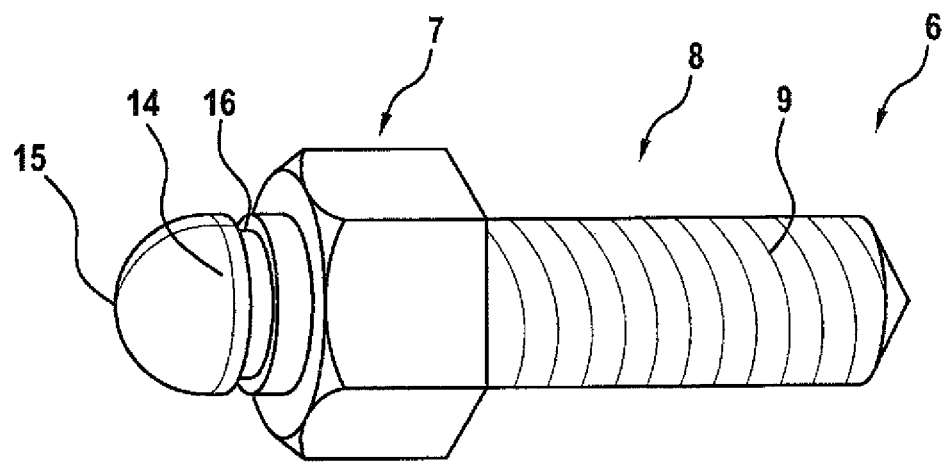

FIG. 4 shows a detail view of the screw 6. In this representation it can clearly be seen that the latching element 16 is configured as a latching depression, which is additionally continuous in circumferential direction. Correspondingly the latching element 16 enables a rotatable support of the covering device 18 in the safety protrusion 14. As a consequence no torque can be applied on the screw 6 via the covering device 18.

Figure 5:
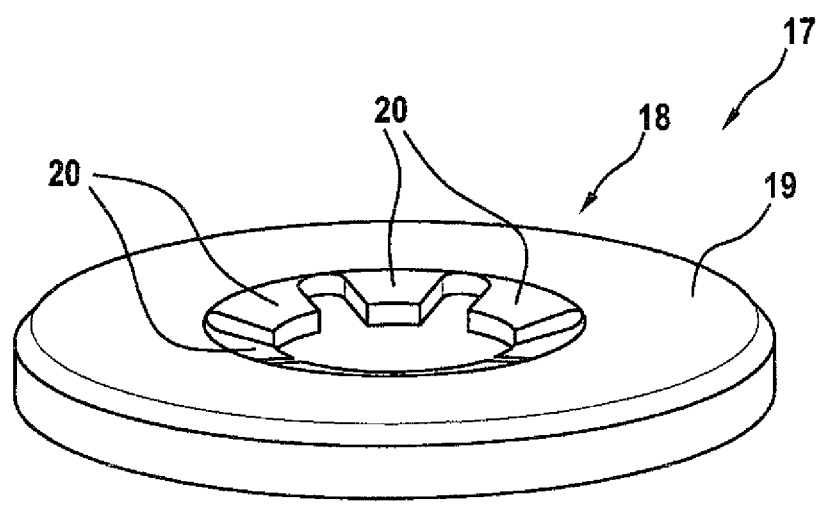

FIG. 5 shows a detail view of the covering device 18, which as mentioned above is configured as a clamping disc. The covering device 18 is formed correspondingly by a base body 19, which is preferably configured as a circular ring. From the base body 19 latching protrusions 20 of the latching element 17 extend in radial direction inwards. The latching protrusions 20 are hereby configured springed so that a simple pushing on via the safety protrusion 14 up to the latching element 16 is simply possible. As soon as the latching protrusions 20 reach the latching element 16 or the latching depression they latch in so that subsequently the covering device is securely held on the safety protrusion 14. A removal of the covering device 18 from the safety protrusion 14, which is required for actuating the actuating region 7, leaves clear marks so that the manipulation of the fastening device 4 can subsequently be easily detected.

The invention claimed is:

1. A component arrangement, comprising:
a first component having a receptacle;
a second component;
at least one fastening device for tamper-proof fastening of the first component on the second component, said fastening device comprising a screw having an actuating region fully receivable in the receptacle of the first component, a threaded region adjoining the actuating region and constructed for threaded engagement in the second component, and a safety protrusion adjoining the actuating region and being arranged on a side of the actuating region which faces away from the threaded region, said safety protrusion having a latching element; and
a cover constructed as a clamping disc and having a plurality of counter-latching elements constructed for latching engagement with the latching element, said cover fully covering the receptacle of the second component when the threaded region is engaged in the second component and the actuating region is received in the receptacle of the second component, wherein the clamping disc engages with the safety protrusion so that removal of the clamping disc from the safety protrusion causes marks that indicate a tampering with the fastening device.

2. The component arrangement of claim 1, wherein the safety protrusion has a circular cross section with regard to a longitudinal center axis of the screw.

3. The component arrangement of claim 1, wherein an end of the safety protrusion, which faces away from the actuating region, is are configured spherical segment shaped.

4. The component arrangement of claim 3, wherein the end of the safety protrusion is configured semi-spherically.

5. The component arrangement of claim 1, wherein the safety protrusion has dimensions in radial direction that are smaller than a smallest radial dimension of the actuating region.

6. The component arrangement of claim 1, wherein the latching element is configured as a latching depression.

7. The component arrangement of claim 1, wherein the latching element has at least one latching protrusion which engages in the latching depression.

8. The component arrangement of claim 1, wherein the cover has dimensions in radial direction that are greater than a greatest radial dimension of the fastening region.

9. The component arrangement of claim 1, wherein an outer surface of the actuating region is configured polygonal.

* * * * *